3,219,527
PERIDONTAL PACK OR DRESSING COMPOSITION
Benjamin F. Gurney, Glen Ellyn, Ill., assignor to Loyola University, Chicago, Ill., a corporation of Illinois, not for profit
No Drawing. Filed June 17, 1963, Ser. No. 288,437
4 Claims. (Cl. 167—60)

This invention relates to a peridontal pack or dressing composition for use by dentists and oral surgeons in the treatment of the peridontal tissues of the oral cavity incidental to dental operations.

One of the problems involved in connection with dental surgery is the injury done to the peridontal tissues of the oral cavity surrounding the operated area and resulting danger of infection incidental thereto.

An object of the present invention is to provide a new and improved therapeutic peridontal pack or dressing composition which may be used by dentists and oral surgeons as a peridontal pack or dressing incidental to dental operations and oral surgery, and which enhances the cure of any injury done to the peridontal tissues incidental to a dental operation or other form of oral surgery.

Another object of the invention is to provide a new and improved therapeutic peridontal pack or dressing composition which may be readily prepared and used by dentists and oral surgeons in connection with dental or oral surgery.

In the practice of the present invention I may prepare the new therapeutic peridontal pack or dressing composition in accordance with any of the following examples:

EXAMPLE NO. 1

(a) Solid phase

| | Gm. |
|---|---|
| Zinc oxide | 43.0 |
| Tannic acid | 4.0 |
| Kaolin | 27.0 |
| Shredded asbestos fiber | 8.0 |
| Zinc acetate | 1.0 |
| Para-aminotoluene sulfonamide hydrochloride | 17.0 |

The ingredients of the solid phase component, set forth above, are intimately mixed to form a powder.

(b) Liquid phase

| | Ml. |
|---|---|
| Eugenol (2-methoxy allyl phenol or 4-allyl guiacol) | 99.0 |
| NMFE (5-nitro-2-methylfurfuryl ether) | 1.0 |

The ingredients of the liquid phase component, set forth above, are intimately mixed to form a liquid.

In preparing the new therapeutic peridontal pack or dressing composition from the solid phase component and the liquid phase component of Example No. 1, there are added to two or three drops of the liquid phase component a sufficient quantity of the solid phase component, in powder form, to form a relatively thick mixture depending, to some extent, on the consistency or viscosity desired in the resulting therapeutic peridontal composition and its intended use as a peridontal pack or dressing. The normal or average mixing time required is approximately fifteen (15) minutes, at room temperature, following which the new peridontal composition is ready for use by the dentist or oral surgeon as a peridontal pack or dressing.

Additional examples which may be employed in preparing the new peridontal pack or dressing composition are as follows:

EXAMPLE No. 2

(a) Solid phase

| | Gm. |
|---|---|
| Zinc oxide | 43.0 |
| Tannic acid | 4.0 |
| Kaolin | 25.0 |
| Shredded asbestos fiber | 7.0 |
| Zinc acetate | 1.0 |
| Para-aminotoluene sulfonamide hydrochloride | 20.0 |

(b) Liquid phase

| | Ml. |
|---|---|
| Eugenol (2-methoxy allyl phenol or 4-allyl guiacol) | 50.0 |
| Paraffin oil (plasticizing agent) | 46.0 |
| NMFE (5-nitro-2-methylfurfuryl ether) | 4.0 |

The same procedure is followed in mixing the solid phase component and the liquid phase component of Example No. 2 as is set forth in reference to preparing the new peridontal pack or dressing composition in accordance with Example No. 1.

EXAMPLE No. 3

(a) Solid phase

| | Gm. |
|---|---|
| Zinc oxide | 46.0 |
| Tannic acid | 3.0 |
| Kaolin | 29.0 |
| Shredded asbestos fiber | 3.0 |
| Zinc acetate | 2.0 |
| Para-aminotoluene sulfonamide hydrochloride | 17.0 |

(b) Liquid phase

| | Ml. |
|---|---|
| Eugenol (2-methoxy allyl phenol or 4-allyl guiacol) | 60.0 |
| NMFE (5-nitro-2-methylfurfuryl ether) | 4.0 |
| Paraffin oil (plasticizing agent) | 28.0 |
| Thymol | 4.0 |
| Metacresylacetate (plasticizing agent) | 4.0 |

In preparing the new peridontal pack or dressing composition in accordance with the foregoing Example No. 3, the resulting mixture is in the form of a paste due to the use therein of the plasticizing agents in the form of the paraffin oil and the metacresylacetate ingredient in the liquid phase component, which imparts this property to the resulting composition as a result of which the new peridontal composition, as prepared in accordance with the foregoing Example No. 3, is somewhat more pliable than the composition prepared in accordance with Examples Nos. 1 and 2 and does not set as rapidly or as hard as the compositions prepared in accordance with Examples Nos. 1 and 2.

EXAMPLE No. 4

(a) Solid phase

| | Gm. |
|---|---|
| Zinc oxide | 46.0 |
| Rosin powder | 29.0 |
| Tannic acid | 3.0 |
| Shredded asbestos fiber | 4.0 |
| Zinc acetate | 1.0 |
| Para-aminotoluene sulfonamide hydrochloride | 17.0 |

(b) Liquid phase

| | Ml. |
|---|---|
| Eugenol (2-methoxy allyl phenol or 4-allyl guiacol) | 75.0 |
| NMFE (5-nitro-2-methylfurfuryl ether) | 4.0 |
| Metacresylacetate (plasticizing agent) | 21.0 |

EXAMPLE No. 5

(a) Solid phase

| | Gm. |
|---|---|
| Zinc oxide | 43.0 |
| Rosin powder | 13.0 |
| Kaolin | 13.0 |
| Tannic acid | 3.0 |
| Shredded asbestos fiber | 4.0 |
| Zinc acetate | 5.0 |
| Para-aminotoluene sulfonamide hydrochloride | 19.0 |

(b) Liquid phase

| | Ml. |
|---|---|
| Eugenol (2-methoxy allyl phenol or 4-allyl guiacol) | 99.0 |
| NMFE (5-nitro-2-methylfurfuryl ether) | 1.0 |

EXAMPLE NO. 6

(a) Solid phase

| | Gm. |
|---|---|
| Zinc oxide | 73.0 |
| Kaolin | 3.0 |
| Shredded asbestos fiber | 4.0 |
| Zinc acetate | 3.0 |
| Para-aminotoluene sulfonamide hydrochloride | 17.0 |

(b) Liquid phase

| | Ml. |
|---|---|
| Eugenol (2-methoxy allyl phenol or 4-allyl guiacol) | 99.0 |
| NMFE (5-nitro-2-methylfurfuryl ether) | 1.0 |

EXAMPLE NO. 7

(a) Solid phase

| | Gm. |
|---|---|
| Zinc oxide | 43.0 |
| Rosin powder | 13.0 |
| Kaolin | 13.0 |
| Tannic acid | 3.0 |
| Shredded asbestos fiber | 8.0 |
| Para-aminotoluene sulfonamide hydrochloride | 20.0 |

(b) Liquid phase

| | |
|---|---|
| Eugenol (2-methoxy allyl phenol or 4-allyl guiacol) ml | 70.0 |
| Metacresylacetate (plasticizing agent) ml | 21.0 |
| NMFE (5-nitro-2-methylfurfuryl ether) ml | 4.0 |
| Zinc acetate (dissolved in the solvent consisting of the eugenol and NMFE) gm | 5.0 |

EXAMPLE NO. 8

(a) Solid phase

| | Gm. |
|---|---|
| Zinc oxide | 75.0 |
| Tannic acid | 3.0 |
| Shredded asbestos fiber | 4.0 |
| Para-aminotoluene sulfonamide hydrochloride | 18.0 |

(b) Liquid phase

| | |
|---|---|
| Eugenol (2-methoxy allyl phenol or 4-allyl guiacol) ml | 98.0 |
| NMFE (5-nitro-2-methylfurfuryl ether) ml | 1.0 |
| Zinc acetate (dissolved in the solvent consisting of the eugenol and NMFE) gm | 1.0 |

In place of the rosin powder employed in the solid phase component of the foregoing Examples 4, 5 and 7 I may substitute equal quantities of magnesium oxide or of calcium hydroxide, or mixtures of these two materials, within the same working ranges, since these materials also impart the desired adhesiveness to the resulting composition.

In place of the kaolin inert ingredient or extender specified in the solid phase of the foregoing Examples Nos. 1, 2, 3, 5, 6, and 7 I may substitute in equal quantities of barium hydroxide within the same working ranges, as an inert ingredient or extender. Thus, typical compositions employing these materials may be prepared according to the following examples:

EXAMPLE NO. 9

(a) Solid phase

| | Gm. |
|---|---|
| Zinc oxide | 46.0 |
| Tannic acid | 3.0 |
| Magnesium oxide | 29.0 |
| Shredded asbestos fiber | 4.0 |
| Zinc acetate | 1.0 |
| Para-aminotoluene sulfonamide (free base) | 17.0 |

(b) Liquid phase

| | Ml. |
|---|---|
| Eugenol (2-methoxy allyl phenol or 4-allyl guiacol) | 75.0 |
| NMFE (5-nitro-2-methylfurfuryl ether) | 4.0 |
| Metacresylacetate (plasticizing agent) | 21.0 |

EXAMPLE NO. 10

(a) Solid phase

| | Gm. |
|---|---|
| Zinc oxide | 46.0 |
| Tannic acid | 3.0 |
| Calcium hydroxide | 29.0 |
| Shredded asbestos fiber | 4.0 |
| Zinc acetate | 1.0 |
| Para-aminotoluene sulfonamide (free base) | 17.0 |

(b) Liquid phase

| | Ml. |
|---|---|
| Eugenol (2-methoxy allyl phenol or 4-allyl guiacol) | 75.0 |
| NMFE (5-nitro-2-methylfurfuryl ether) | 4.0 |
| Metacresylacetate (plasticizing agent) | 21.0 |

EXAMPLE NO. 11

(a) Solid phase

| | Gm. |
|---|---|
| Zinc oxide | 43.0 |
| Tannic acid | 4.0 |
| Barium hydroxide | 27.0 |
| Shredded asbestos fiber | 8.0 |
| Zinc acetate | 1.0 |
| Para-aminotoluene sulfonamide hydrochloride | 8.5 |
| Para-aminotoluene sulfonamide (free base) | 8.5 |

(b) Liquid phase

| | Ml. |
|---|---|
| Eugenol (2-methoxy allyl phenol or 4-allyl guiacol) | 99.0 |
| NMFE (5-nitro-2-methylfurfuryl ether) | 1.0 |

The new peridontal pack or dressing compositions prepared in accordance with the foregoing Examples Nos. 2, 3, 4, and 7 is somewhat more pliable than the compositions prepared in accordance with Examples Nos. 1, 5, 6 and 8, and does not set as rapidly or as hard as the composition of Examples Nos. 1, 5, 6 and 8, due to the use therein of a plasticizing agent in the form of paraffin oil or metacresylacetate as an ingredient in the liquid phase component thereof.

The zinc oxide ingredient of the solid phase component of the new composition, as prepared in accordance with the foregoing examples reacts with the eugenol (2-methoxy allyl phenol or 4-allyl guiacol) to produce a hardening effect in the composition. The tannic acid ingredient of the solid phase component of the compositions prepared in accordance with the foregoing examples functions as an escarotic agent which precipitates protein from the tissues of the oral cavity, adjacent the peridontal pack or dressing, over the injured peridontal tissues, and the resulting protein acts as a protective surface over the injured area. The kaolin ingredient of the solid phase of the compositions as set forth in the foregoing examples acts as an inert mineral or extender to give body to the composition, and the shredded asbestos fiber ingredient of the solid phase component adds cohesiveness to the mixture.

The zinc acetate when used in either the solid phase or the liquid phase of any of the foregoing examples serves to accelerate the reaction between the zinc oxide and the eugenol and to decrease the setting time of the complete mixture, and the thymol, when used in the liquid phase component of certain of the foregoing examples serves to improve the odor of the final mixture.

The para-aminotoluene sulfonamide ingredient of the solid phase component of the new peridontal pack or dressing composition, whether used as the hydrochloride (Examples Nos. 1 to 8, inclusive), or as the free base (Examples Nos. 9 and 10), or as a mixture of these materials (Example No. 11), adds bactericidal characteristics to the new peridontal composition. Fungicidal properties are added to the new peridontal composition by the 5-nitro-2-methylfurfuryl ether ingredient of the liquid phase component. The eugenol (2-methoxy allyl phenol or 4-allyl guiacol) of the liquid phase component acts primarily as an analgesic. The thymol ingredient of the liquid phase component serves as an odorant to impart an ethereal odor to the resulting composition.

The active ingredients of the new peridontal pack or dressing compositions as set forth in the foregoing examples, are useful therein, in general, within the following ranges:

(a) SOLID PHASE (1) Zinc oxide: Forty-three (43) to seventy-five (75) percent, by weight, of the solid phase component;
(2) Tannic acid: Three (3) to four (4) percent, by weight, of the solid phase component;
(3) Kaolin: Inert;
(4) Shredded asbestos fiber: Three (3) to eight (8) percent, by weight, of the solid phase component;
(5) Para-aminotoluene sulfonamide: Not substantially less than seventeen (17) percent, nor substantially more than twenty (20) percent, by weight, of the solid phase component.

The useful working ranges of the active ingredients of the liquid phase component of the new peridontal compositions set forth in the foregoing examples are as follows:

(6) 5-nitro-2-methylfurfuryl ether: Not substantially less than one (1) percent, nor substantially more than four (4) percent, by volume, of the liquid phase component;
(7) Eugenol (2-methoxy allyl phenol or 4-allyl guiacol): From not substantially less than fifty (50) percent to not substantially more than ninety-nine (99) percent, by volume, of the liquid phase component.

Eugenol is a common descriptive term which is defined in the handbook of Chemistry and Physics, Forty-fourth Edition, 1962–63 (page 996) (The Chemical Rubber Publishing Company) as 4-allyl guiacol or eugenic acid.

The new composition may be used as a therapeutic peridontal pack or dressing and when so used builds up well and adheres well to the tooth and lies as a bandage or dressing over the peridontal surfaces and protects them while, at the same time, enhancing the action of the tissues in healing the injured tissues due to the action of the composition in depositing protein from the adjacent tissues over the injured surface area, as pointed out above. Moreover, it is therapeutically useful and efficacious for a period of from 36 to 48 hours, at body temperatures.

The new peridontal pack or dressing composition has both bactericidal and fungicidal characteristics and is distinctly more efficacious in this regard than almost all of the common antibiotics such, for example, as penicillin, aureomycin, and chloromycin which, while having bactericidal characteristics, have no fungicidal characteristics.

It will thus be seen from the foregoing description that the present invention provides a new and improved therapeutic peridontal pack or dressing composition having the desirable advantages and characteristics and accomplishes its intended objects including those hereinbefore pointed out and others which are inherent in the invention.

I claim:
1. A non aqueous therapeutic peridontal pack composition including
   (1) a liquid phase consisting of
      (a) eugenol, and
      (b) 5-nitro-2-methylfurfuryl ether
      (c) the eugenol being incorporated in the liquid phase of the composition within a range of from not substantially less than fifty (50) percent to not substantially more than ninety-nine (99) percent, by volume, of the liquid phase,
      (d) the 5-nitro-2-methylfurfuryl ether being incorporated in the liquid phase of the composition within a range of from not substantially less than one (1) percent to not more than four (4) percent, by volume, of the liquid phase,
   (2) a solid phase comprised of an intimate mixture of
      (a) a material selected from the group consisting of paraaminotoluene sulfonamide hydrochloride and paraaminotoluene sulfonamide free base incorporated in the solid phase within a range of from not substantially less than seventeen (17) percent to not substantially more than twenty (20) percent, by weight, of the solid phase,
      (b) a reactant for the eugenol selected from the group consisting of zinc oxide, magnesium oxide, barium hydroxide and calcium hydroxide incorporated in the composition within a range of from not substantially more than seventy-five (75) percent, by weight, of the solid phase,
      (c) shredded asbestos fiber incorporated in the solid phase within a range of from not substantially less than three (3) percent to not substantially more than eight (8) percent, by weight, of the solid phase,
      (d) an inert material in the form of kaolin, and
      (e) the liquid phase and the solid phase being present in the ratio of from two (2) to three (3) drops of the liquid phase with a quantity of the solid phase sufficient to form a relatively thick mixture.

2. A therapeutic dental pack composition as defined in claim 1 in which the solid phase includes tannic acid incorporated within a range of from three (3) to four (4) percent, by weight, of the solid phase of the composition.

3. A therapeutic dental pack composition as defined in claim 1 which includes a minor proportion of zinc acetate as an accelerator of the reaction between the eugenol and the said reactant.

4. A therapeutic dental pack composition as defined in claim 1 in which the said liquid phase is a plasticizing agent selected from the group consisting of metacresylacetate and paraffin oil within a range of from not substantially less than one (1) percent to not substantially more than forty-nine (49) percent, by volume, of the liquid phase, and imparts to the composition a paste-like consistency.

References Cited by the Examiner
UNITED STATES PATENTS 2,927,056  3/1960  Gurney _____ 167—60

OTHER REFERENCES

Accepted Dental Remedies, 28th Ed., published by the American Dental Association, Chicago, 1963, page 171.
Roydhouse: Materials in Dentistry, published by Year Book Medical Publishers, Inc., Chicago, 1962, pages 117 and 119.

LEWIS GOTTS, *Primary Examiner.*

FRANK CACCIAPAGLIA, JR., *Examiner.*